United States Patent [19]
Williams

[11] Patent Number: 5,244,168
[45] Date of Patent: Sep. 14, 1993

[54] METHODOLOGY AND APPARATUS FOR FORCED AIR AIRCRAFT DEICING

[76] Inventor: Lee A. Williams, 595 Wildwood Dr., New Smyrna Beach, Fla. 32168

[21] Appl. No.: 807,540

[22] Filed: Dec. 13, 1991

[51] Int. Cl.$^5$ .............................................. B64D 15/10
[52] U.S. Cl. ............................... 244/134 R; 244/134 C
[58] Field of Search ......................... 244/134 R, 134 C; 15/50; 137/101.15, 101.21, 114, 93, 88; 239/172; 134/45, 123, 172

[56] References Cited

U.S. PATENT DOCUMENTS

| | | | |
|---|---|---|---|
| 4,032,090 | 6/1977 | Thornton-Trump | 244/134 C |
| 4,842,005 | 6/1989 | Hope et al. | 244/134 C |
| 4,986,497 | 1/1991 | Susko | 244/134 C |
| 5,028,017 | 7/1991 | Simmons et al. | 244/134 C |
| 5,096,145 | 3/1992 | Phillips et al. | 244/134 R |
| 5,104,068 | 4/1992 | Kulla et al. | 244/134 C |

FOREIGN PATENT DOCUMENTS 02987779  1/1989  European Pat. Off. .

*Primary Examiner*—Galen Barefoot
*Attorney, Agent, or Firm*—Daniel L. Dawes

[57] ABSTRACT

The use of potentially toxic deicing fluids can be substantially reduced, sometimes by as much as an order of magnitude, by selectively providing air entrained deicing fluid in a air jet or blast. The delivery parameters, e.g. the flow rate of deicing fluid and the entraining air are adjusted according to the specific snow or icing conditions on the aircraft surface on each application. A choice of deicing fluids are available, typically Type I and Type II deicing fluids. Deicing fluids may be heated or unheated as determined by the operator choice according to icing conditions. The type and amount of fluid is mixed within a mixing nozzle attached to a depending operator bucket connected to a boom on a mobile vehicle. The flow rate and pressure of heated or unheated pressurized air mixed with the deicing fluid is also adjusted according to icing conditions. The air entrained deicing fluid is then applied to the aircraft surface according to any one of a plurality of spray patterns determined according to icing conditions. The same or a separate nozzle is also employed to apply a fine atomizing mist of Type II fluid to the clean surface of the aircraft for anti-icing after a deicing treatment.

20 Claims, 3 Drawing Sheets

METHODOLOGY AND APPARATUS FOR FORCED AIR AIRCRAFT DEICING

BACKGROUND OF THE INVENTION

1. Field of the Invention

The present invention relates to the field of aircraft deicing, and in particular, to aircraft deicing methodologies and apparatus using forced air in combination with deicing fluids.

2. Description of the Prior Art

Deicing has traditionally been performed by spraying large quantities of heated antifreeze, or glycol and water mixtures onto the iced surfaces of the aircraft. While this method is effective in deicing, it is associated with increasing costs of glycol and concern with the environmental impact of glycol runoff and wastage. To counter this concern, the prior art has proposed construction of elaborate and expensive multimillion dollar deicing pads wherein the glycol runoff is captured and recycled. Such deicing pads have the disadvantage of not only being very expensive but requiring a specialized structure or area into which the aircraft is driven for deicing. It is preferable to provide a methodology and apparatus which is capable of deicing the aircraft in virtually any convenient location in its ground cycle.

Patterson, "Airplane Wing Deicer," U.S. Pat. No. 2,422,746 (1947) describes a high pressure air and liquid jet positioned at the forward portion of an airplane wing, so that the jet and the fluid ejected by the jet underlies any film of ice that forms on the wing edges and surfaces. The purpose of the jets of air and liquid are to tear off the accumulations of ice and snow on the forward edges of the wing, and to allow the air stream, while the aircraft is flying, to tear off the remaining ice accumulated on the rear and upper surfaces of the wing. However, such a prior art system is inappropriate for present aircraft practices which require deicing prior to takeoff. Furthermore, incorporation in a large jet aircraft of a deicing pattern such as shown by Patterson unnecessarily adds to the expense, complexity, weight and fuel usage of the aircraft and is unnecessary in modern jet aircraft.

Magnusson et al, "Deicing and Cleaning System for Aircrafts," U.S. Pat. No. 4,378,755 (1983) shows a fixed installation deicing structure, similar in concept to a car wash, through which the aircraft is driven when it is deiced. The structure includes two stages or portals. At the first portal, all snow and ice is washed off by hot water. This hot water deicing is accomplished by abundant spraying of heated water. At a second portal, the aircraft is then showered with concentrated glycol to prevent coatings of snow and ice until the aircraft is airborne. Magnusson is an example of the multimillion dollar fixed deicing station which the prior art has sought to offer as a means of reducing glycol usage.

Garrison, "Airplane Wing Deicing Means," U.S, Pat. No. 2,390,093 (1945) describes an airplane wing in which the leading edge is made from a porous metal which allows a quantity of anti-icing fluid to exude and spread uniformly over the outer surface. The anti-icing fluid is atomized and pressurized in a chamber behind the leading porous metal edge. The pressurized atomized fluid may also be heated prior to being pumped into the cavities behind the porous wing edge. The icing fluid then defuses through the sintered metal edge to loosen the ice formed on the leading edge of the wing surface when in flight. Garrison is, thus similar to Patterson for showing a deicing surface installed within a wing surface designed to principally operate under flight conditions and, therefore, shares the same disadvantages as Patterson discussed above.

Sammons, "Prevention of Ice Formation in Air Intakes on Aircraft and Other Fast Moving Vehicles," U.S. Pat. No. 2,482,720 (1949) and Palmatier, "Fan Deicing or Anti-Icing Means", U.S. Pat. No. 2,406,473 (1946) are both directed to various means used in connection with aircraft engines, in which deicing fluid is distribute on selected surfaces of the engine by using part of the air stream created by the driven propeller. In Sammons, hot air exhaust from the engine is used as a means for deicing. A guard is provided to the air intact of a compressor and hot air supplied through jets which flow past the guard. In Palmatier, an air stream is produced by the rotor blades to aid in the distribution of the deicing liquid along the surface of the stator blades. Some of the deicing fluid is entrained in the air stream produced by the rotor and carried there by engagement with surfaces of the stator blades. However, both Palmatier and Sammons are solely concerned with providing air entrained deicing fluid for very specifically restricted surfaces within an aircraft engine and are operable only when the engine is operating. No means is suggested by either as to how the major airfoil surfaces of a standing aircraft can be appropriately deiced by methodology or apparatus which is not built in to the aircraft, and yet which is easily portable and usable at any site during the ground cycle of a landed aircraft.

BRIEF SUMMARY OF THE INVENTION

The invention is an apparatus for deicing aircraft comprising a plurality of sources of deicing fluid. A first control is coupled to the plurality of sources of deicing fluid. The first control varies the delivery parameters of the deicing fluid from the plurality of sources. A source of pressurized air provided. A second control is coupled to the source of pressurized air for variable control of delivery parameters of the pressurized air. A mixing nozzle is selectively coupled to the plurality of sources of deicing fluid through the first control and to the source of pressurized air as controlled by the second control. The mixing nozzle mixes the pressurized air and deicing fluid from a selected one of the plurality of sources of deicing fluid to provide a spray pattern for application to the aircraft to deice the aircraft. As a result, increased economy, effectiveness of deicing application, and lessened environmental impact is achieved.

The plurality of sources of deicing fluid include a source of Type I fluid and a source of Type II deicing fluid. The first control selectively controls flow rate of deicing fluid selected from the plurality of sources. The first control further selectively controls temperature of the deicing fluid delivered to the mixing nozzle. The second control selectively controls pressure of the pressurized air delivered to the mixing nozzle. The second control selectively controls pressure of the pressurized air delivered to the mixing nozzle. The mixing nozzle further comprises a mechanism for providing a selected one of a plurality of spray patterns.

The apparatus further comprises a low flow nozzle selectively coupled to the plurality of sources of deicing fluid for delivering a solid spray of the deicing fluid. The low flow nozzle delivers an atomized mist of heated or unheated deicing fluid.

The first control includes a heater for heating the deicing fluid in one pass through the heater.

The apparatus further comprises a mobile vehicle in which the plurality of sources, first control, source of pressurized air, second control and mixing nozzle are included. The vehicle comprises a vehicle body, a telescopic boom coupled to the vehicle body, and an operator basket coupled to the boom. The boom is coupled to the operator basket at the top of the operator basket so that the basket is positioned above the site of application of the deicing fluid to the aircraft when in an operating configuration. An operator within the operator basket views and controls the mixing nozzle from a position looking downward to the site of application on the aircraft. The mixing nozzle is included as part of the operator basket.

The plurality of sources of deicing include further comprises a mechanism for pneumatically transferring the deicing fluid from the source to the mixing nozzle. The mechanism for a pneumatically transferring the deicing fluid into the mixing nozzle comprises a tank for holding the deicing fluid and a mechanism for maintaining positive air pressure above the deicing fluid within the tank to force the deicing fluid pneumatically from the tank into the mixing nozzle.

The mechanism for pneumatically transferring the deicing fluid from the source to the mixing nozzle further comprises a venturi tip disposed within the mixing nozzle which venturi tip and tube is coupled to the source of deicing fluid so that pressurized air flowing through the mixing nozzle draws the deicing fluid through the venturi tip by suction.

The invention is also a method for deicing aircraft comprising the steps of supplying a selected deicing fluid. The selected deicing fluid is provided to a mixing nozzle at a selected delivery parameters. Pressurized air is provided. The pressurized air is supplied at selected delivery parameters to the mixing nozzle. The deicing fluid and pressurized air are mixed to form a selected spray pattern of air entrained deicing fluid. The spray is directed at an application site on an aircraft. The steps of providing selected fluid at selected delivery parameters and providing the pressurized air at selected delivery parameters are specifically chosen according to the nature of deicing conditions on the application site of the aircraft for each application.

The step of providing selected fluid at selected delivery parameters comprises the step of selectively providing Type I or Type II deicing fluid. The step of providing pressurized air at selected delivery parameters comprises the step of selectively providing air flow rates according to deicing conditions at each the application. The step of providing selected fluid at selected delivery parameters comprises the step of providing deicing fluid flow rates according to deicing conditions on each application.

The method further comprises the step of selectively providing a spray pattern according to deicing conditions at the application site.

The method further comprises the steps of applying deicing fluid to the aircraft prior to substantial of ice thereon. In this context, "ice" should be understood to mean ice, snow, frost, sleet, freezing rain and other weather elements which are the object of aircraft deicing. Ice is allowed to accumulate on the aircraft which has deicing fluid preapplied thereon. Thereafter the previoulsly mentioned steps are performed, namely the steps of supplying a selected deicing fluid, providing the selected deicing fluid, supplying pressurized air, providing the pressurized air at selected delivery parameters, mixing the deicing fluid and pressurized air to form a selected spray pattern of air entrained deicing fluid, and directing the spray at an application site on the aircraft. The object of the method is to lower the adhesion of the ice to the aircraft surface by pretreating the aircraft surface with a substance, such as deicing fluid, before any substantial build up of adhesive deposits have been allowed to occur. Thereafter, the efficiency of removal by air or a combination of heated or unheated air and entrained deicing fluid is substantially improved.

The invention and its various embodiments may now be better visualized by considering the following drawings, wherein like elements are referenced by like numerals.

Figure 1:
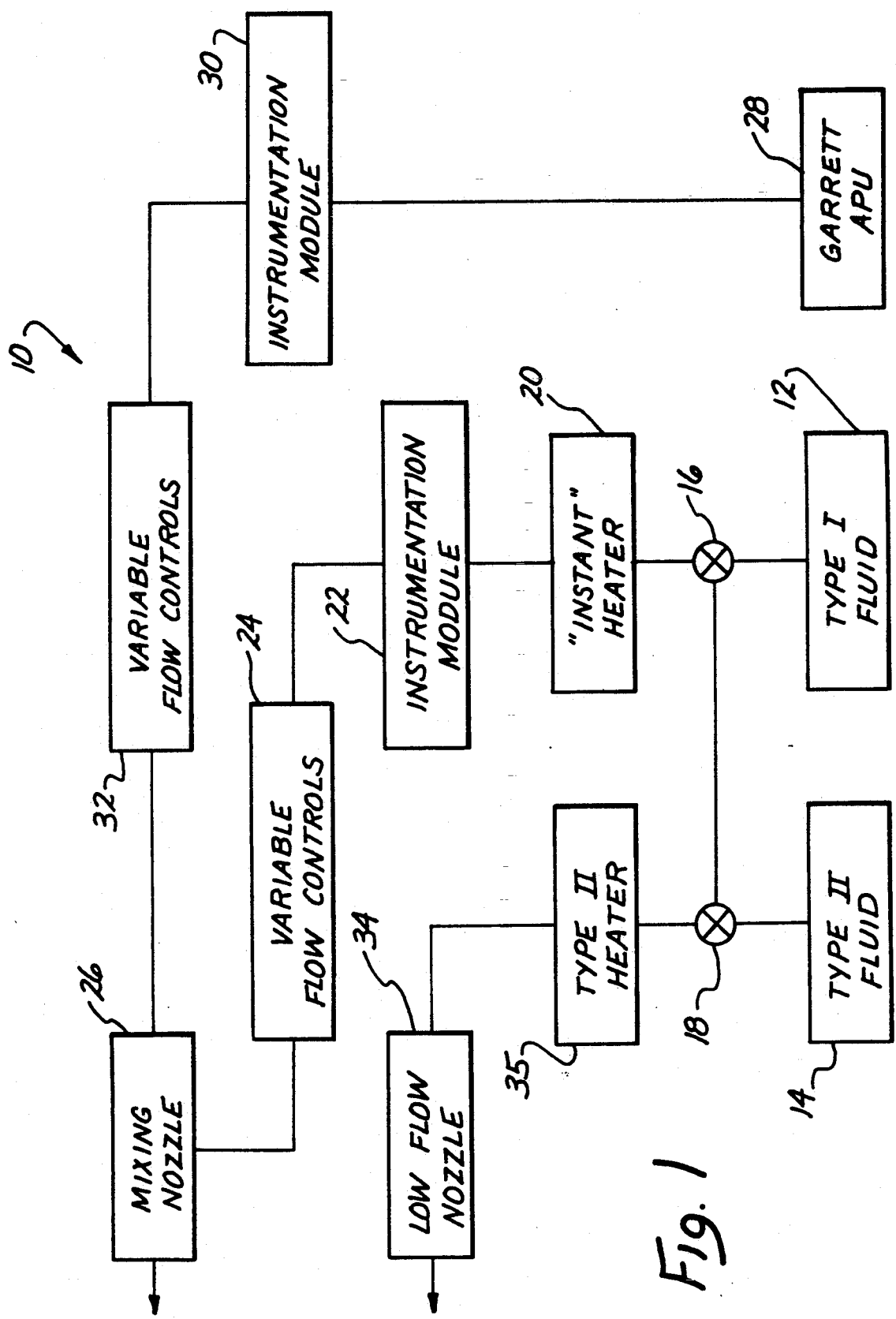
FIG. 1 is a block diagram, showing an apparatus in which the methodology of the invention may be employed.

The invention and its various embodiments may now be understood by turning to the following detailed description.

DETAILED DESCRIPTION OF THE PREFERRED EMBODIMENTS

The use of potentially toxic deicing fluids can be substantially reduced, sometimes by as much as an order of magnitude, by selectively providing air entrained deicing fluid in a air jet or blast. The delivery parameters, e.g. the flow rate of deicing fluid and the entraining air are adjusted according to the specific snow or icing conditions on the aircraft surface on each application. A choice of deicing fluids are available, typically Type I and Type II deicing fluids. Deicing fluids may be heated or unheated as determined by the operator choice according to icing conditions. The type and amount of fluid is mixed within a mixing nozzle attached to a depending operator bucket connected to a boom on a mobile vehicle. The flow rate and pressure of heated or unheated pressurized air mixed with the deicing fluid is also adjusted according to icing conditions. The air entrained deicing fluid is then applied to the aircraft surface according to any one of a plurality of spray patterns determined according to icing conditions. The same or a separate nozzle is also employed to apply a fine atomizing mist of Type II fluid to the clean surface of the aircraft for anti-icing after a deicing treatment.

FIG. 1 is a conceptual block diagram of a mobile deicing and anti-icing system which uses an air and fluid-mixing methodology to minimize glycol or deicing fluid usage while still effectively deicing or anti-icing the control surfaces of an aircraft. Deicing fluid is stored within system 10 within a storage tank 12 or 14. In the illustrated embodiment, two types of deicing fluid are considered, namely Type I and Type II Deicing Fluid, although a single type or more than two types could be included within the methodology of the invention. Typically, Type I fluids are unthickened and contain a minimum of 80% glycol. Commonly used within the United States, Type I fluids are useful for removal of ice and snow from aircraft exterior surfaces and protect against refreezing, mainly when no precipitation conditions exist. Type II fluids are chemically thickened and contain a minimum of 50% glycols. Type II fluids are specifically designed not only to remove ice, but also to protect against refreezing, even during certain precipitation conditions. In the illustrated embodiment, Type I and Type II fluids are referenced and to be understood as those fluids are defined by the Association of European Airlines (AEA). However, the invention is not limited to these types, but include Mil Spec fluids and any other type of deicing or anti-icing fluid now known or later developed.

In either case, fluid is drawn either from tanks 14 or 12 as controlled by appropriate valving 16 and 18 respectively and heated by heater 20. In the illustrated embodiment, heater 20 is termed an "instant" heater in that it provides a rapid transfer of heat into the deicing fluid. The transfer is rapid enough to allow the fluid to be heated in a single pass through heater 20, although it is within the contemplation of the invention that retention of the fluid for a short heating cycle within the heater subsystem, comprising heater 20, may occur. Ideally, a high BTU fired heater and heat exchanging system is employed to heat the fluid as fast as it is pumped.

In addition to heater 20 or in the alternative, deicing fluid delivered to nozzle 26 may be delivered in a conduit placed within or at least in heat exchanging relationship to the hot air conduit along the boom connecting nozzle 26 to the equipment or apu 28 on the truck. The placement and construction of the deicing fluid conduit in the hot air conduit on the boom may be constructed to enhance by conventional means the amount of heat transferred into it from the hot air also being delivered to the nozzle.

The heated fluid then passes through an instrumentation module 22 which measures the delivery parameters, for example, the flow rate, temperature and pressure of the heated fluid. Module 22 controls the various elements of system 10 as described below to provide a user-selected set of delivery parameters. The monitored, controlled and heated fluid flows through a variable flow control 24 which can be automatically or manually controlled to provide the appropriate pressure and flow rates of fluid to a mixing nozzle 26.

Simultaneously, an auxiliary power unit 28, such as a conventional Garrett auxiliary power unit (APU), provides pressurized and heated air to instrumentation module 30. In the illustrated embodiment, clean heated bleed air is provided, but it is also contemplated that exhaust air from unit 28 or air in an heat exchange relationship with exhaust air from unit 28 could be provided. Instrumentation module 30 monitors the delivery parameters, e.g. the flow rate, pressure and temperature of air from APU 28 for the purpose of manually or automatically controlling the air flow variables by means of a variable flow control 32. Variable flow control 32, like control 24, controls the pressure and flow rates of the fluid or in this case, air flowing through it to mixing nozzles 26.

In many conventional APU's, heating and cooling of the output air is also provided in addition to pressurized flow. Therefore, it is within the scope of the present invention that instrumentation module 30 would also monitor and control the temperature of compressed air provided by APU 28 to variable flow control 32 and mixing nozzle 26.

In any case, heated or unheated fluid is mixed with heated or unheated pressurized air within mixing nozzle 26 to provide as desired a predetermined spray pattern of air entrained deicing or anti-icing fluid. Some of the air patterns contemplated by the present invention are described below in connection with FIGS. 3a-3d.

System 10 also includes the ability to provide conventional low-flow solid deicing or anti-icing fluid through appropriate control of valves 16 and 18 to divert fluid from tanks 12 or 14 to a low-flow nozzle 34 through a type II heater 35. Low-flow nozzle 34 is conventional and it is intended to provide fluid for aircraft cleaning, deicing or anti-icing according to conventional methodologies if desired. Although the system in FIG. 1 has been conceptually shown as providing heated fluid to low-flow nozzle 34, it is expressly contemplated that appropriate plumbing may also be provided to provide a unheated low-flow fluid to nozzle 34 as well.

Figure 2:
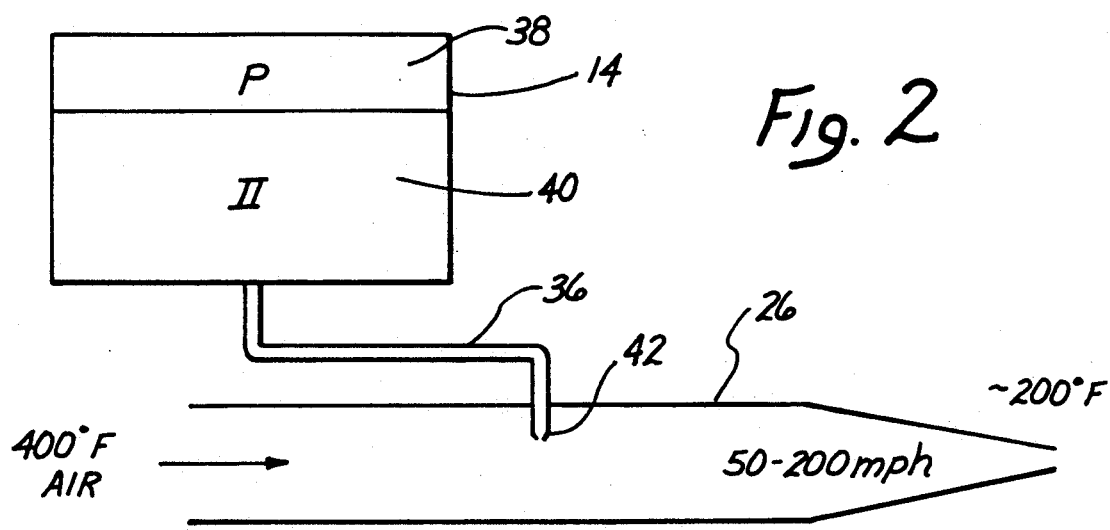
FIG. 2 is an idealized schematic diagram of the apparatus and methodology which may be employed in the system of FIG. 1 by which deicing fluid is injected into a compressed air stream.

Before considering the methodology of fluid application of the present invention, first turn to the diagrammatic depiction of FIG. 2 of tank 14, wherein greater detail of the mechanism whereby Type II fluid from tank 14 is provided to mixing nozzle 26. For the purpose of simplicity, connection of tank 14 to nozzle 26 is shown in FIG. 2 by means of a unimpeded line 36. Heater 20, instrumentation module 22 and variable flow controls 24 have been deleted from the diagrammatic depiction of FIG. 2 for the sake of simplicity of illustration. However, it must also be understood that FIG. 2 is generally descriptive of an alternative means or circuit for delivering Type II fluid to mixing nozzle 26 in which the control of the Type II fluid to nozzle 26 would be determined according to pressures within tank 14 and nozzle 26 without the intervention of intervening control valves or means in line 36 connecting tank 14 with nozzle 26.

FIG. 2 shows tank 4 as a closed tank, having a predetermined pressure, P, maintained in an air space 38 at the top of tank 14. The remainder of tank 14 is filled with Type II fluid 40. Air from APU 28 is heated and forced into nozzle 26 at a flow rate of approximately 50 to 200 miles per hour, depending upon control, past the tip of a venturi tube 42 inserted within the air stream in nozzle 26. The temperature of the air from APU 28 is approximately 400 degrees Fahrenheit at venturi tip 42. The venturi effect at tube tip 42 draws deicing fluid 40 from tank 14 through line 36 into the air stream within nozzle 26. By controlling the velocity of air flow within nozzle 26 from APU 28, and the pressure within space 38 within tank 14, the amount of fluid 40 drawn from tank 14 can be arbitrarily and accurately controlled.

The advantage of a pressurized control system for Type II deicing fluid is the gentleness by which the fluid is handled. One of the advantages of using Type II deicing fluid is its thixotropic characteristic. Type II fluid is relatively gelatinous when stationary and becomes relatively more fluid when flowing. One of the persistent and difficult problems of the prior art with respect to handling the Type II fluid, has been the degradation of the Type II fluid when heated or pumped. Pumping tends to break the long polymer chains which characterize the Type II fluid, thereby reducing its static viscosity. It is desirable to maintain the static viscosity of the Type II fluid as high as possible so that it is sticky and stays in place when deposited on the wings of the aircraft.

In the illustration of FIG. 2, fluid 40 is forced into the nozzle 26 without necessarily passing though a pump, but is pneumatically forced through the combination of the positive pressure within air space 28 and a vacuum at the tip of venturi tube 42. As a result, the Type II fluid becomes entrained in the high velocity air stream within nozzle 26 with substantially no mechanical damage prior to entrainment. The entrained fluid is then formed into a spray pattern and delivered from the tip of nozzle 26 approximately at 200 degrees Fahrenheit and with flow rates of the order of approximately 55 pounds of air per minute. In the embodiment to FIG. 2, the heating of the deicing fluid may in fact occur totally within mixing nozzle 26 as it becomes entrained in the hot air provided by APU 28.

Figure 3A:
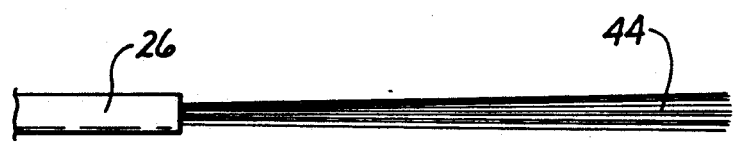
FIGS. 3a–3d are schematic diagrams showing a plurality of spray patterns which may be employed by the methodology practice with the apparatus of FIG. 1.

FIGS. 3a–3d illustrate some of the spray patterns that can be provided by nozzle 26. FIG. 3a diagrammatically depicts a solid stream for use on heavy wet snow or frozen deposits. Stream 44 is delivered from nozzle 26 by providing a maximum air flow volume with maximum injected fluid flow volume.

Figure 3B:

FIG. 3b illustrates a dispersed yet still solid spray for use on medium wet snow or popcorn frost deposits. Stream 46 is produced from nozzle 26 by appropriate adjustment of the nozzle orifice according to conventional principles as well as providing a medium degree of air flow rate and medium fluid flow injection.

Figure 3C:
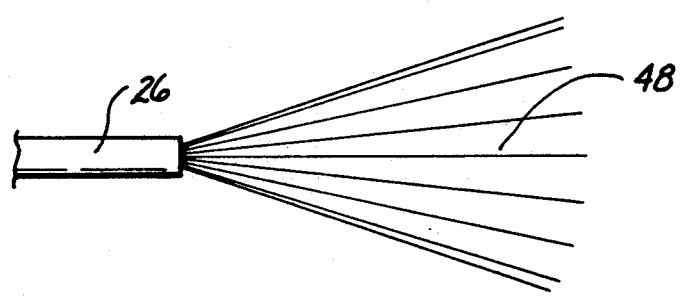

FIG. 3c depicts a light mist spray 48 for use on light dry snow or hoar frost. Again, mist 48 is produced by appropriate adjustment by conventional means of the orifice of nozzle 26 combined with a low air flow rate and low fluid flow injection rate.

Figure 3D:
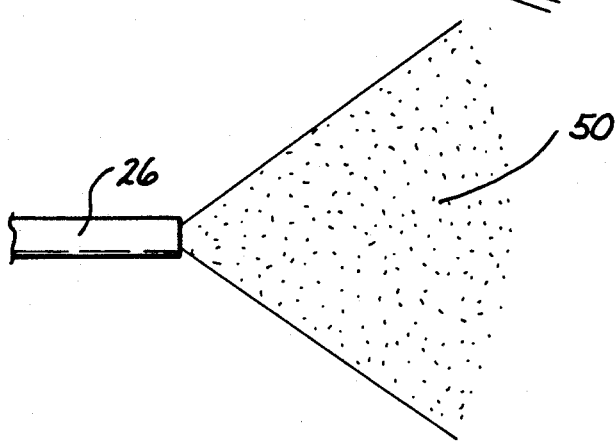

Finally, FIG. 3d depicts a well-dispersed atomized spray pattern 50, again, by appropriate internal configuration within nozzle 26 and proportioning the air flow rate to the fluid flow rate. The atomized mist 50 does not carry the high momentum impact of the other spray patterns, particularly spray patterns 44 and 46, but is used to provide an even and continuous liquid layer on a generally clean aircraft surface as an anti-icing agent. Atomization of the fluid is achieved in nozzle 26 using conventional techniques.

Figure 4:
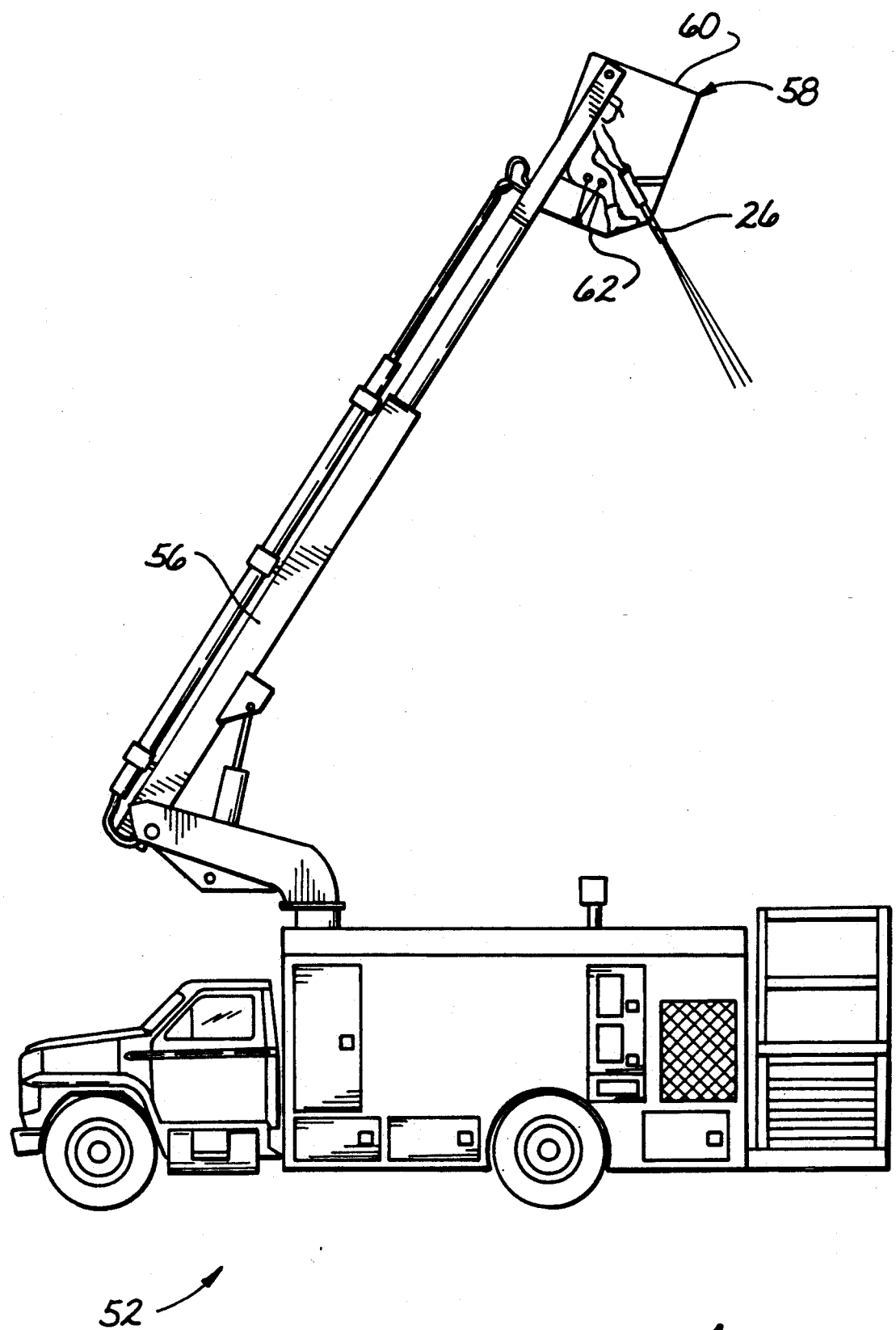
FIG. 4 is a perspective view of a vehicle carrying the apparatus of the invention and with which the methodology of the invention may be employed.

Turn now to FIG. 4 which shows a mobile deicing vehicle 52 which has been retrofitted with a air/fluid deicing unit 54, housing the system depicted and described in connection with FIG. 1. Vehicle 52 is provided with a conventional boom assembly 56 on which heated compressed air and heated fluid is provided from unit 54. Boom 56 is then attached to a modified bucket assembly 58, adapted to provide a work station for an operator and mounting a platform for mixing nozzle 26. Bucket assembly 58 is coupled to boom 56 at top 60 of bucket assembly 58 so that the entire bucket assembly hangs or is suspended from the end of boom 56. The operator is then seated within bucket assembly 58 and is provided controls within bucket assembly 58 so that he can position himself over any designated portion of the aircraft as may be desired.

A substantial portion of the side and bottom 62 of bucket assembly 58 is provided with a transparent covering so that the operator may look downwardly from the suspended bucket assembly onto the work surfaces of the aircraft below as he applies the air entrained spray patterns to the aircraft through nozzle 26. Unlike prior air bucket assemblies in deicing vehicles where the spray patterns and apparatus were generally deployed to be manipulated from the operator's waist level and higher, even to the point of including the situation in which the spray stream was arched upward, the general work position of the embodiment of FIG. 4 is directed from the operator's waist down so that the spray streams are in field of vision below and always directed down from the operator.

This has the advantage that the operator may routinely position himself more closely to the aircraft surface without fear of the possibility of collision damage to the aircraft. In the prior art type of aerial bucket configurations, the operator was required to typically maintain a distance of at least 20 feet from the aircraft in order to avoid collision between the bucket and the aircraft. However, in the configuration of FIG. 4, working distances as close as 10 feet can routinely and safely be practiced without fear of collision damage. This has the added advantage of not only better visual inspection and control of the deicing operation, but also a more powerful and effective application of the deicer and anti-icing spray patterns at a substantially closer range.

Consider now the methodology employed in connection with the system of FIGS. 1–4. When an aircraft lands a coating of warm or cold type II fluid is applied immediately or at least at the first practical opportunity to the aircraft surface to allow for later easy removal. Type II fluid is designed to shear off from the aircraft surfaces at 85–120 knots. Therefore, an air blast of 100–200 mph will shear off the predeposited type II fluid and any ice or snow deposits. Alternatively or in addition to the above pretreatment, an aircraft carrying snow, ice, sleet or frost on its fuselage, wings or tail is approached at the landing gate or at any other desired point in the ground cycle by a deicing vehicle of the type shown in FIG. 4. The type of snow and ice is then observed on the aircraft by the operator. The operator picks the appropriate nozzle patterns as depicted in FIGS. 3*a*–3*d*, according to the specific snow and ice conditions on the aircraft. It is even possible, for example, that the aircraft may be first swept with a hot air flow to economically and cleanly remove any loose or powdery snow and ice before treatment with a deicing or anti-icing fluid was performed. Thus, after the aircraft has then possibly been air swept, the Type I or, if desired, a Type II deicing fluid is delivered through nozzle 26 to directed portions of the aircraft according to an arbitrary and variable operator-selected choice of air and fluid temperatures, air flow rates and fluid flow rates, combined with a selected spray pattern. Each of these parameters can be independently varied, alone or in combination, to empirically determine which type of fluid or delivery condition is the most effective for breaking up the type of snow, ice or frost condition or conditions that occur on the aircraft at the time.

After the aircraft has thus been appropriately deiced according to the specific conditions, the system of FIG. 4 is then used to delivery Type II fluid through a atomized mist 50 as depicted in FIG. 3*d* to the cleaned surfaces of the aircraft. Unheated Type II fluid is delivered, if desired, through an atomizing low flow nozzle 34 and adhered to the aircraft surfaces as an anti-icing lubricant. Therefore, even if the aircraft should remain standing for a significant period of time in snowing or freezing precipitation in a taxi way, at the gate, or on the apron, snow, ice or freezing rain will be substantially prevented from adhering or otherwise fastening to the aircraft surface, since a temporary barrier type of Type II fluid has substantially coated all the critical surfaces of the craft. Thereafter, even if the snow and ice becomes appreciable, just before takeoff, the deicing vehicle of FIG. 4 may be utilized to reuse the aircraft surface with a heated air flow to brush the nonadhering snow, ice and sleet from the aircraft to re-present a clean surface and provide visual certainty of a properly deiced condition for the aircraft prior to takeoff.

The system of the present invention, and the methodology employed by it has the advantage of a more efficient use of less materials for increased economy and less an impact on the environment.

Secondly, the system of the invention provides a wider option for use of lubricants and nontoxic deicing fluids than prior art systems where physical contact between the deicing fluid and iced surface is required.

Thirdly, safety of the deicing procedure is increased because the hold over time of the Type II fluid on the aircraft is increased. The ice and snow removal occurs by air entrained heated fluid and once the surface is clean, cold deicing fluid, characterized by high viscosity, is laid down in a fine thin layer evenly over the aircraft surface for maximum adhesion or hold over time. Safety is also increased in that toxicity to workers is lessened because of use of smaller amounts of the toxic glycol bearing deicing fluids with the possibility of using nontoxic deicing fluids which are nonglycol based. Safety is still further improved by the reduction or elimination of fumes or odor accumulation within the aircraft which often accompanies glycol deicing. Finally, safety is increased by reduction of physical ramp hazards since the wasted glycol drained from the aircraft in the vicinity of the deicing station reduces traction both for personnel and vehicles working in the vicinity of the aircraft.

Fourthly, the methodology and apparatus of the invention improves retention and processing of the deicing materials, since substantially less deicing materials are used. In other words, if in those situations where glycol recovery is contemplated, the amount of equipment, energy and costs necessary for pumping, aeration and other process and retention steps are correspondingly decreased with the more efficient use of the glycol material. For example, glycol usage in the invention of the present system in a 20 minute application may be used at the rate of 8 gallons per minutes for a total usage of 160 gallons. Conventional deicers, at the present time, typically deliver 50 to 60 gallons per minute of glycol during the same period for a total of 1,000 to 1,200 gallons. The cost, and environmental recovery problems are, therefore, reduced by almost an order to magnitude by the methodology and apparatus of the invention.

The illustrated embodiment has been set forth only for the purposes of example and should not be taken as limiting the invention as defined by the following claims. The following claims, therefore, must be read to include not only what is literally defined, but all means now known or later discovered for performing substantially the same function in substantially the same way to obtain substantially the same result.

I claim:

1. An apparatus for deicing aircraft comprising:
    a plurality of sources of deicing fluid;
    first control means coupled to said plurality of sources of deicing fluid, said first control means for variable control of delivery parameters of said deicing fluid from said plurality of sources;
    a source of high speed forced air;
    second control means coupled to said source of high speed forced air for variable control of delivery parameters of said high speed forced air;
    a mixing nozzle selectively coupled to said plurality of sources of deicing fluid through said first control means and to said source of high speed forced air as controlled by said second control means, said mixing nozzle for selectively mixing varying amounts of said high speed forced air with varying amounts of deicing fluid from a selected one of said plurality of sources of deicing fluid to provide a spray pattern for application to said aircraft to deice said aircraft, said spray pattern characterized by delivery of a high speed colloidal suspension deicing fluid in air at velocities approximately in the range of 100-200 mph so that the momentum per unit of mass of said deicing fluid is sufficient to mechanically dislodge snow and ice from said aircraft according to on-site user determination and selection while utilizing a minimum mass of deicing fluid,
    whereby increased economy, effectiveness of deicing application, and lessened environmental impact is achieved.

2. The apparatus of claim 1 wherein said plurality of sources of deicing fluid include a source of Type I fluid and a source of Type II deicing fluid.

3. The apparatus of claim 1 wherein said first control means selectively controls flow rate of deicing fluid selected from said plurality of sources.

4. The apparatus of claim 3 wherein said first control means further selectively controls temperature of said deicing fluid delivered to said mixing nozzle.

5. The apparatus of claim 1 wherein said second control means selectively controls flow rate of said pressurized air delivered to said mixing nozzle.

6. The apparatus of claim 1 wherein said second control means selectively control pressure of said pressurized air delivered to said mixing nozzle.

7. The apparatus of claim 5 wherein said second control means selectively controls pressure of said pressurized air delivered to said mixing nozzle.

8. The apparatus of claim 1 further comprising a low flow nozzle selectively coupled to said plurality of sources of deicing fluid for delivering a solid spray of said deicing fluid.

9. The apparatus of claim 8 wherein low flow nozzle delivers an atomized mist of deicing fluid.

10. The apparatus of claim 1 further comprising a mobile vehicle in which said plurality of sources, first control means, source of pressurized air, second control means and mixing nozzle are included, said vehicle comprising a vehicle body, a telescopic boom coupled to said vehicle body, and an operator basket coupled to said boom, said boom being coupled to said operator basket at the top of said operator basket so that said basket is positioned above said site of application of said deicing fluid to said aircraft when in an operating configuration, an operator within said operator basket viewing and controlling said mixing nozzle from a position looking downward to said site of application on said aircraft, said mixing nozzle being included as part of said operator basket.

11. The apparatus of claim 1 wherein said plurality of sources of deicing include further comprises means for pneumatically transferring said deicing fluid from said source to said mixing nozzle.

12. The apparatus of claim 11 wherein said means for a pneumatically transferring said deicing fluid into said mixing nozzle comprises a tank for holding said deicing fluid and means for maintaining positive air pressure above said deicing fluid within said tank to force said deicing fluid pneumatically from said tank into said mixing nozzle.

13. The apparatus of claim 12 wherein said means for pneumatically transferring said deicing fluid from said source to said mixing nozzle further comprises a venturi tip disposed within said mixing nozzle and coupled to said source of deicing fluid so that pressurized air flowing through said mixing nozzle draws said deicing fluid through said venturi tip by suction.

14. A method for deicing aircraft comprising the step of:
supplying a selected deicing fluid;
providing said selected deicing fluid to a mixing nozzle at selected delivery parameters;
high speed forced air;
providing selectively varied amounts of high speed forced air at selected delivery parameters to said mixing nozzle as determined by a user at the site of application of said deicing fluid to said aircraft;
mixing said deicing fluid and high speed forced air to form a selected spray pattern of a high speed colloidal suspension of deicing fluid in air, said spray pattern characterized by delivery of said a high speed colloidal suspension of deicing fluid at velocities simulating shear velocities experienced at takeoffs and having a selectively determined momentum per unit of mass of deicing fluid sufficient to mechanically dislodge snow and ice from said aircraft according to on-site user determination and selection while utilizing a minimum mass of deicing fluid; and
directing said spray at an application site on said aircraft, said steps of providing selected fluid at selected delivery parameters and providing said high speed forced air at selected delivery parameters being specifically chosen according to the nature of deicing conditions on said application site of said aircraft for each application.

15. The method of claim 14 wherein the step of providing selected fluid at selected delivery parameters comprises the step of selectively providing Type I or Type II deicing fluid.

16. The method of claim 14 wherein the step of providing pressurized air at selected delivery parameters comprises the step of selectively providing air flow rates according to deicing conditions at each said application.

17. The method of claim 14 wherein the step of providing selected fluid at selected delivery parameters comprises the step of providing deicing fluid flow rates according to deicing conditions on each application.

18. The method of claim 14 further comprising the step of selectively providing a spray pattern according to deicing conditions at said application site.

19. A method of deicing an aircraft comprising the steps of:
wetting said aircraft with a deicing fluid prior to substantial disposition of ice thereon;
allowing accumulation of ice on said aircraft having deicing fluid preapplied thereon;
providing a deicing fluid to a nozzle at selected delivery parameters;
directing said spray at an application site on said aircraft;
providing said deicing fluid to a mixing nozzle at selected delivery parameters;
providing selectively varied amounts of high speed forced air at selected delivery parameters to said mixing nozzle as determined by a user at the site of application of said deicing fluid to said aircraft;
mixing said deicing fluid and high speed forced air to form a selected spray pattern of a high speed colloidal suspension of deicing fluid in air, said spray pattern characterized by delivery of a high speed collodial suspension of deicing fluid in air at velocities simulating shear velocities experienced at takeoffs and having a selectively determined momentum per unit of mass of said deicing fluid sufficient to mechanically dislodge snow and ice from said aircraft according to on-site user determination and selection while utilizing a minimum mass of deicing fluid; and
directing said spray at an application site on said aircraft, said steps of providing deicing fluid at selected delivery parameters and providing said high speed forced air at selected delivery parameters being specifically chosen according to the nature of deicing conditions on said application site of said aircraft for each application.

20. The method of claim 19 where said step of supplying a deicing fluid comprises the step of providing one or more selected ones of a plurality of types of deicing fluids and mixtures of said types of deicing fluids, said one or more selected ones being specifically chosen according to the nature of deicing conditions on said application site of said aircraft for each application.

* * * * *